D. T. SEALE.
AXLE.
APPLICATION FILED APR. 17, 1912.
1,060,507.
Patented Apr. 29, 1913.
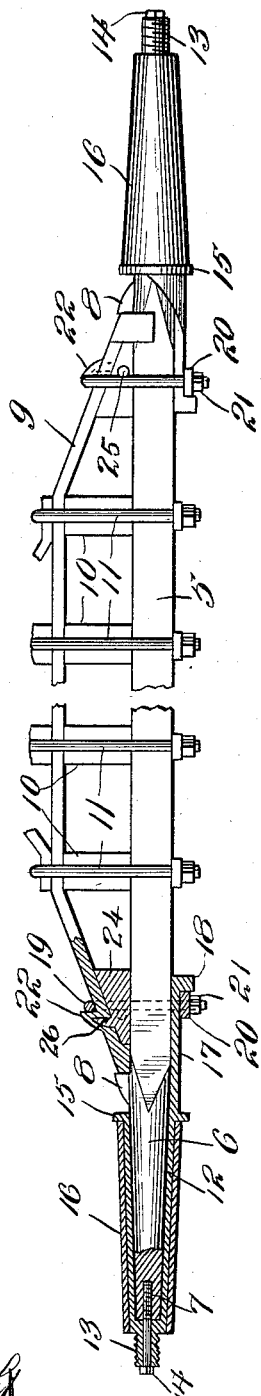
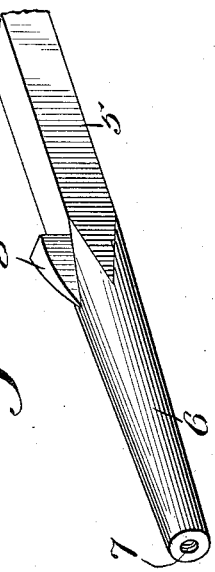
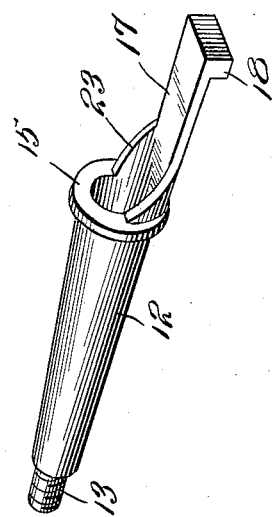
Witnesses
Inventor
Daniel T. Seale,
By Victor J. Evans,
Attorney

UNITED STATES PATENT OFFICE.

DANIEL T. SEALE, OF FLORALA, ALABAMA.

AXLE.

1,060,507.  Specification of Letters Patent.  Patented Apr. 29, 1913.

Application filed April 17, 1912.  Serial No. 691,281.

*To all whom it may concern:*

Be it known that I, DANIEL T. SEALE, a citizen of the United States, residing at Florala, in the county of Covington and State of Alabama, have invented new and useful Improvements in Axles, of which the following is a specification.

The invention relates to axle skeins, and more particularly to the class of detachable axle skeins for carriages, wagons or the like.

The primary object of the invention is the provision of an axle skein in which the outer and inner ends thereof may be securely fastened so as to obviate the possibility of the accidental working of the skein from the spindle end of the axle, yet the said section may be readily detached from the spindle end when desired.

Another object of the invention is the provision of an axle skein which will be prevented from rotation upon the spindle end and that may be securely fastened thereto without the possibility of the same working loose should the vehicle be subjected to severe usage.

A further object of the invention is the provision of an axle skein wherein the spindle end of the axle is prevented from wearing through so as to increase the life of the axle and also to materially strengthen the same.

A further object of the invention is the provision of an axle skein which is simple in construction, strong, durable and inexpensive in manufacture.

With these and other objects in view the invention consists in the construction, combination and operation of parts as will be hereinafter more fully described, illustrated in the accompanying drawing, and pointed out in the claims hereunto appended.

In the drawing: Figure 1 is a front elevation of an axle showing the improved axle skeins constructed in accordance with the invention mounted thereon, one of the skeins being shown in vertical section. Fig. 2 is a perspective view of one of the skeins removed from the axle spindle. Fig. 3 is a fragmentary perspective view of the axle showing one of the spindle ends and the skein removed.

Similar reference characters indicate corresponding parts throughout the several views in the drawing.

Referring to the drawings by numerals, 5 designates an axle of the ordinary well-known type, although preferably constructed from steel or other metal, and is formed at each end with an outwardly tapering spindle 6, having a threaded socket 7 opening through its outer end, while formed on the top of the axle 5 contiguous to the inner end of the spindle 6 is an abutment lug 8 against which contacts the adjacent end of a spanning bar 9 adapted to support the front bolster of the vehicle frame in any ordinary well-known manner, the bar 9 being separated from the axle 5 by means of the spacing blocks 10 held within inverted U-shaped clips 11 mounted in the ordinary manner upon the said axle. Detachably mounted upon each spindle end 6 is an axle skein 12 the closed outer end of which is formed with a reduced threaded nut receiving extension 13 having a central bore receiving a detachably threaded bolt 14, the inner threaded end of which is screwed into the threaded socket 7 in the outer end of the spindle 6 for assisting in fastening the axle skein 12 thereon. Formed on the inner open end of the axle skein 12 is an outturned annular flange 15 against which frictionally engages the inner end of the axle box 16 of the ordinary well-known construction, which is adapted to surround the axle skein 12 when the hub of a wheel is mounted thereon. Projecting inwardly from and integral with the flanged end 15 of the axle skein 12 at the lowermost point thereof is a flattened tongue 17 provided with a down-turned right angularly disposed lip 18, the tongue 17 being designed to engage with the under side of the axle 5 and extends longitudinally thereof for a distance along the same. Straddling the axle 5 and the spanning bar 9 is an inverted U-shaped clip 19, the ends of which are passed through a connecting plate 20 which abuts against the lip 18 of the tongue 17, the said plate 20 being connected to the limbs of the clip 19 by means of the usual nuts 21 threaded thereon, while the closed end of the clip 19 rests against a stop lug 22 struck up from the spanning bar 9, and this lug 22 prevents the working loose of the clip 19 when in position for securing the tongue 17 of the axle skein 12 fast to the axle. Inserted between the axle 5 and the inclined end of the spanning bar 9 are wedge-shaped spacing blocks 24 which are formed with laterally extending pins 25 abutting against the clips 19, the blocks being also formed with lugs 26 which engage in the lugs 22 in the said bar 9 so as to avoid displacement of the said blocks when arranged in position.

It will be apparent that the axle skein 12 is fastened at its outer end to the spindle 6, while the inner end of the said skein is clipped to the axle 5 so that it will be impossible for the said axle skein to work loose from the spindle end or turn thereon. By reason of the formation of the tongue extension 17 on the axle skein 12 and also in view of the fact that the spindle end 6 is received within the latter the axle 5 and its spindle end will be materially reinforced so as to give maximum strength thereto, and at the same time the said spindle end will be prevented from wearing. Integral with the tongue 17 and the flange 15 at the point of juncture thereof are upwardly diverging side webs 23 which embrace opposite sides of the axle spindle 6 and these webs are designed to materially reinforce the point of juncture of the flange and tongue on the axle skein.

From the foregoing, taken in connection with the accompanying drawing, it is thought that the construction and operation of the invention will be clearly understood, and therefore, a more extended explanation has been omitted.

What is claimed is:—

1. The combination with an axle having a spindle end provided with a threaded socket in the outer extremity thereof and a lug rising from the point of juncture of the spindle with the axle, of a spanning bar superimposed upon the axle and abutting against the said lug and having a projection struck upwardly therefrom, an axle skein fitted upon the said spindle and having a reduced threaded extension at the outer end thereof, a bolt passed centrally through the extension and detachably engaged in the threaded socket in the spindle end, a tongue formed on and projecting inwardly from the inner end of the skein and having an out-turned lip, and a clip embracing the spanning bar, axle and tongue and abutting against the projection on the spanning bar and the out-turned lip for the fastening thereof.

2. The combination with an axle having a spindle end provided with a threaded socket in the outer extremity thereof and a lug rising from the point of juncture of the spindle with the axle, of a spanning bar superimposed upon the axle and abutting against the said lug and having a projection struck upwardly therefrom, an axle skein fitted upon the said spindle and having a reduced threaded extension at the outer end thereof, a bolt passed centrally through the extension and detachably engaged in the threaded socket in the spindle end, a tongue formed on and projecting inwardly from the inner end of the skein and having an out-turned lip, a clip embracing the spanning bar, axle and tongue and abutting against the projection on the spanning bar and the out-turned lip for the fastening thereof, and a wedge-shaped spacing block interposed between the spanning bar and axle and having laterally projecting pins abutting against the clip to prevent the swinging of the latter toward the spindle end.

In testimony whereof I affix my signature in presence of two witnesses.

DANIEL T. SEALE.

Witnesses:
E. EDMONSTON, Jr.,
FRANK O. CARTER.

Copies of this patent may be obtained for five cents each, by addressing the "Commissioner of Patents, Washington, D. C."